July 27, 1926. 1,594,039
W. A. BAUM
MANOMETER
Filed Oct. 8, 1920

Inventor,
William A. Baum.
By Horney Sele
Attorneys.

Patented July 27, 1926.

1,594,039

UNITED STATES PATENT OFFICE.

WILLIAM A. BAUM, OF NEW YORK, N. Y., ASSIGNOR TO W. A. BAUM CO. INC., OF NEW YORK, N. Y., A CORPORATION OF NEW YORK.

MANOMETER.

Application filed October 8, 1920, Serial No. 415,603, and in Canada July 10, 1920.

This invention relates to manometers for the accurate measurement of pressure or vacua in fluids, or of differences in pressure or in vacua between several points in fluid systems.

Manometers for such use may be broadly divided into two classes: the aneroid type and the fluid-displacement type. As is well known to engineers and others familiar with its performance, results secured with the former type cannot be relied upon. With the fluid-displacement type much inconvenience has, heretofore, been experienced, tending to make its employment in the securing of accurate results always bothersome and oftentimes impossible, especially so where mercury is used as the fluid.

With the closed-end, or compressed-air-and-fluid instrument of the fluid-displacement type, some of these dfficulties have not obtained, only, however, at the expense of accuracy, due to variations in the compressibility of the confined air, which necessarily accompanies changes in atmospheric conditions.

With the open-end instruments of the fluid-displacement type, some of the chief defects have been: spilling of fluid, presence of valves required to be operated by hand in order to open or close either or both ends of the manometer tube, previous to or after using, respectively; adjustable scale, whose "zero" mark is required to be brought to the level of the fluid in the manometer tube when normally at rest; fluctuating of the fluid-column where the pressure under measurement fluctuates, making it necessary to take an "average" or a "mean" reading, or to make corrective calculations therefor; "air-pockets" or breaks in the fluid-column, sometimes difficult to eliminate and which, if not detected, cause inaccurate readings; breakage due to the hammer action of the measuring fluid; and other objections from the standpoint of convenience in use.

The object of my invention is the production of a manometer which combines simplicity and accurateness of construction and which eliminates breakage and the error-causing features above outlined, to the end that accuracy of results be automatically assured, independent of the human element in its use. The embodiment of the invention herein illustrated and specifically described is in the form of a so-called sphygmomanometer, or apparatus for the indirect determination of blood-pressure, but it should be understood that my invention is in no way limited thereto, and that this form is chosen by way of illustration.

The form illustrated is particularly adapted for use in measuring both the systolic (maximum) and diastolic (minimum) blood-pressures by the more accurate and so-called "auscultatory method" of their determination. An indirect estimation of the pressure in the blood stream is made by direct measurement of the pressure in a pneumatic constricting armlet, conveniently placed over a large artery in a limb (as the upper arm of a human being). The pressure in the blood stream varies rythmically, between the systolic and diastolic pressures, during each cardiac cycle or pulsation. It will be seen, therefore, that the constricting pneumatic armlet is, in effect, a tambour, sensitive to these cyclic variations of the pressure in the blood stream and transmitting them to the manometer fluid, which tends to respond or oscillate in synchronism. Such oscillations are undesirable, for the reason that the technique of the auscultatory method is auditory for both pressures, involving the use of a stethoscope (not shown), conveniently placed over the artery, near and distal to the point of application of the constricting means (for instance at the bend of the elbow if the armlet be placed over the artery in the upper arm), in a manner well known to those acquainted with the art.

In connection with the use of my invention in the form of a sphygmomanometer, mercury is used as the measuring fluid, and one of the objects of the invention is to reduce the oscillation of the mercury in the manometer tube, due to transmitted variations of pressure in the blood stream, as explained above, so that accurate readings can be taken; another object of the invention in this connection is the production of a permanently mounted and accurately calibrated scale or gauge in connection with the mercury column, so that no corrective calculations for, or physical adjustments of, the said scale or gauge need be made; and another object of the invention is so to construct the apparatus that the mercury cannot be spilled from its container or from its measuring column tube, while at the same time the hammer action of the mercury and consequent breakage is eliminated or reduced to a minimum; all to the end that the reading on the gauge shall be the final and accurate measure of the blood-pressure.

In the illustrative drawings which form a part of this invention—

Figures 1, 2, 3:
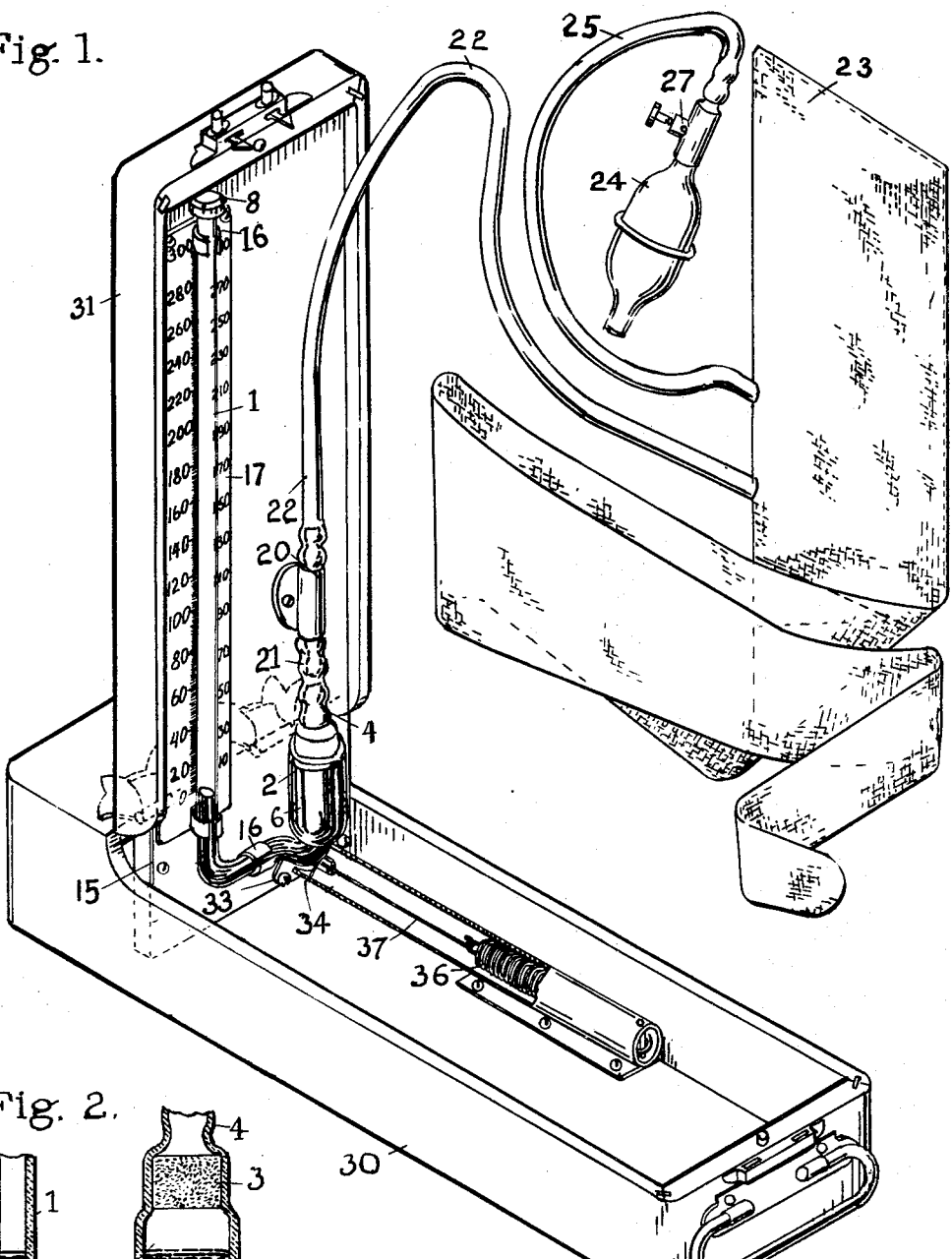
Figure 1 is a perspective of the manometer in the form of a sphygmomanometer.
Fig. 2 is a vertical section of a mercury container and a portion of the measuring tube, illustrating the preferred means of preventing escape of mercury from its container.
Fig. 3 is a vertical section of a cap used upon the top of the measuring tube.

In these drawings a sphygmomanometer is shown as comprising a measuring tube 1 integrally connected with an expanded mercury container and pressure chamber 2 of convenient shape and size for the purpose indicated. Both the measuring tube and the mercury container are of glass and are fused or otherwise formed into a unitary construction. Measuring tubes of the character referred to are commonly spoken of in the trade as "capillary" tubes. I have found in practice (and have so illustrated) that a tube of comparatively large bore, say from three-sixteenths to one-fourth of an inch, gives very good results. Such a tube tends to nullify the effects of oxidation, to eliminate air-pockets, and to prevent adhesion of small particles of mercury in the top of the tube whereby the tube might become sealed and the accuracy of the reading destroyed.

The top of the mercury container and pressure chamber is closed by means of a trap 3 which offers little or no resistance to the free passage of air but which prevents the escape of mercury from the top of the container, as when the instrument is tipped or turned upside down. The trap shown comprises a solid plug of the desired porosity which is fused or cemented in place. After careful experiments and tests I have adopted as a convenient and suitable material an "artificial porous stone" consisting primarily and essentially of silica, such for example as described in United States Letters Patent No. 1,117,601, dated November 17, 1914. Such a material can be fused with the glass and thus absolutely secured in position; possesses the desired strength, and does not disintegrate or combine with the mercury when in use. It is proof against the common mineral acids, is water permeable and may be readily cleansed and freed from foreign substances. The use of a trap of this character as distinguished from traps which extend into the tube, such for example as illustrated in United States Letters Patent to Nicholson, 1,134,632, April 6, 1915, permits of a reduction in the size of the mercury container and consequently reduces the hammer action of the mercury therein. As illustrated in Fig. 2 the mercury container may normally be filled nearly to the top. Elimination of the hammer action is of importance not only to prevent breakage of the mercury container, but also to prevent breakage and displacement of the trap intended to prevent the escape of mercury therefrom.

The mercury container or pressure chamber is provided at its upper end with a nipple 4 to serve as a convenient means of attachment for the pressure apparatus, or for the fluid the pressure of which is sought to be measured.

The desired amount of mercury 6 is located in the mercury chamber and under normal conditions, of course, extends upward into the measuring tube to the same level as in the chamber.

Means are provided on the top of the measuring tube also to prevent the escape of mercury. Contrary, however, to the trap above described these means should not afford a perfectly free passage of air but should offer such resistance to the flow of air therethrough as to dampen oscillations in the mercury column, and to steady or stabilize it, so as to permit accuracy in reading the mercury positions therein. Barometer kid possesses these qualifications and I have illustrated a disc 7 thereof mounted above the end of the measuring tube by means of a pierced metal screw cap 8, a suitable gasket 9 being employed on the lower side of the kid, and a threaded collar 11 being securely and hermetically attached at the top of the tube as a means of attachment for the cap.

The means illustrated and described for permitting the flow of air in the measuring tube above the measuring fluid and for dampening fluctuations of the measuring fluid whereby the mean pressure of the fluid sought to be measured may be readily ascertained, also serves to prevent hammer action in the end of the tube when the latter is suddenly turned down, as air is thereby trapped in such end. Mercury can only flow in such end on displacing the air, with the result that the mercury, under the conditions stated, instead of moving to the end of the tube as a solid column, flows into such end along the lower part or diametrical half of the tube bore, the upper half of the bore permitting flow of air necessary to permit the displacement of the mercury.

The apparatus thus far described is securely but preferably removably mounted upon a plate 15, as by spring clips 16 16. A calibrated scale or gauge 17 is mounted on the same plate directly behind the measuring tube, so that its zero point is exactly on a level with the mercury column in the tube under equivalent pressure conditions upon both surfaces of the fluid. This gauge, which is illustrated as reading from zero to 300 divisions, is constructed so that each division is the measure of pressure of the equivalent of two millimeters of mercury. In practice I have found it desirable to construct each gauge by hand, individually, for the measuring tube in connection with which it is to be used, as this tends to greater accuracy and eliminates error due to variations in the cross-sectional area of the interior of the measuring tube at different points along its length.

A double nippled connection 20 is also mounted upon the plate 15 in a convenient position so that one of its nipples may be connected with nipple 4 of the pressure chamber by means of a non-expandable rubber tube 21. A non-expandable rubber tube 22 is securely placed over the other nipple of the connection and extends to a pressure bag 23 of the usual armlet of standard and well-known construction. The pressure bag is to be inflated by means of a pump 24 shown in the form of a bulb connected therewith by another non-expandable rubber tube 25.

A valve 27 is connected with the air system at a convenient place for introducing, when desired, a leak in the system, or for maintaining the then pressure therein.

I have illustrated the sphygmomanometer as mounted in a box or casing 30 sufficiently large to contain the armlet, connecting tubes and pump, so that the whole can be conveniently packed in small compass and is readily accessible for use. The lid 31 of the box is hinged to the top of the box at a short distance from the rear thereof and the plate 15 is suitably mounted on the lid, so that when the box is open and the lid in upright position the bottom of the plate is but a short distance from the bottom of the box. As it is obviously of importance that the measuring column be vertical when in use I have provided automatic means to assure that the same be perpendicular to the bottom of the box. These means comprise an abutment 33 fastened on the face of the plate 15 and a stop 34 fastened on the inside of the box, with automatic means whereby when the box lid is unlatched, the lid and plate will be brought to an upright position and the abutment will strike the stop, the parts being so located that in this position a perpendicular relation of the measuring tube to the bottom of the box is maintained. The automatic means illustrated comprise a coil spring 36 having one end fastened to the forward end of the stop (shown as a hollow cylinder), and having the other end connected with the abutment 33 by a link 37. Thus it is only necessary for the operator to make certain that the box is resting upon a horizontal plane, or otherwise horizontally held in some convenient way, to assure a vertical position of the measuring tube.

The operation of the illustrated form of my invention in taking blood-pressure by the ausculatory method is as follows:

The armlet is firmly bound around the upper portion of the arm with the pressure bag 23 of the armlet in such a position that when pressure air is forced thereinto it will tend to shut off the flow of blood in the brachial artery, a stethoscope being adjusted over the brachial artery at the elbow. As before stated, the pressure required to balance either the systolic or the diastolic pressure in the blood stream is then determined by auditory means, in a manner well-known to those acquainted with the subject, the manometer being employed to measure, in convenient terms, the amount of such pressures. The necessary pressure is effected by the pump 24 as an inflating means, and the release thereof is effected by valve 27.

Either one or both pressures can be taken several times and averages taken of each to eliminate as far as possible error due to the human element of the operator; and either pressure can be taken independently of the other.

The foregoing detailed description has been given for clearness of understanding, and no undue limitation should be deduced therefrom, but the appended claims should be construed as broadly as permissible in view of the prior art.

What I claim as new and desire to secure by Letters Patent of the United States is:

1. In a manometer, the combination with a pressure chamber, and a measuring tube connected therewith, of a measuring fluid contained therein, and means preventing the escape of measuring fluid from the tube, such means having the characteristics of permitting the flow of air in the measuring tube above the fluid and at the same time dampening fluctuations of the measuring fluid, whereby the mean pressure of the fluid sought to be measured may be readily ascertained, substantially as described.

2. In a manometer, the combination with a pressure chamber and a measuring tube connected therewith, of a measuring fluid contained therein, and a cap of barometer kid closing the measuring tube and having such characteristics as to permit the flow of air in the measuring tube above the measuring fluid, and at the same time dampen fluctuations of the measuring fluid and prevent the escape thereof, substantially as described.

3. In a manometer, the combination with a pressure chamber, and a measuring tube connected therewith, of a measuring fluid contained therein, means closing the measuring tube, and preventing the escape of measuring fluid, such means having the characteristics of permitting the flow of air in the measuring tube above the measuring fluid and at the same time dampening fluctuations of such fluid whereby the mean pressure of the fluid sought to be measured may be readily ascertained, and a calibrated gauge for measuring the height of the measuring fluid substantially as described.

4. In a manometer, the combination of a pressure chamber, measuring fluid contained therein, and a trap secured to the pressure chamber above the measuring fluid and comprising a rigid diaphragm of such porosity as to permit the free flow of air and to prevent the escape of the measuring fluid therethrough, substantially as described.

5. In a manometer, the combination of a pressure chamber, measuring fluid contained therein, and a trap secured to the pressure chamber above the measuring fluid and comprising a silica plug of such porosity as to permit the free flow of air and to prevent the escape of the measuring fluid therethrough, substantially as described.

6. In a manometer, the combination of a pressure chamber, measuring fluid contained therein, and a trap fused to the pressure chamber above the measuring fluid and comprising a silica plug of such porosity as to permit the free flow of air and to prevent the escape of the measuring fluid therethrough, substantially as described.

7. In a manometer, the combination with a pressure chamber and a measuring tube connected therewith, of a measuring fluid contained therein, means secured to the measuring tube for permitting the flow of air therein above the measuring fluid and for dampening fluctuations of the measuring fluid, and a trap secured to the pressure chamber above the measuring fluid and comprising a rigid diaphragm of a diameter relatively large as compared with the bore of the measuring tube and of such porosity as to permit the free flow of air and to prevent the escape of the measuring fluid therethrough, substantially as described.

8. In a manometer, the combination with a pressure chamber and a measuring tube connected therewith, of a measuring fluid contained therein, a cap of barometer kid secured to the measuring tube for permitting the flow of air therein above the measuring fluid and for dampening fluctuations of the measuring fluid, and a trap fused to the pressure chamber above the measuring fluid and comprising a silica plug of such porosity as to permit the free flow of air and to prevent the escape of the measuring fluid therethrough, substantially as described.

9. In a manometer, the combination with a pressure chamber, and a measuring tube connected therewith, of a measuring fluid contained therein, barometer kid closing the top of the measuring tube, and means for fastening the same thereon, said barometer kid preventing the escape therethrough of the measuring fluid, and having the characteristics of permitting flow of air in the measuring tube above the measuring fluid and at the same time dampening the fluctuations of the measuring fluid, a pump, and suitable connections for exerting air pressure in the pressure chamber, and a valve for regulating the air pressure, substantially as described.

10. In a manometer, the combination with a pressure chamber and a measuring tube connected therewith, of a measuring fluid contained therein, means for forcing air into the pressure chamber, a trap secured to the pressure chamber above the measuring fluid and comprising a solid plug of such porosity as to permit the free flow of air and to prevent the escape of the measuring fluid therethrough, and means for closing the measuring tube which permit the flow of air in the measuring tube above the measuring fluid but prevent the escape of the measuring fluid therethrough and dampen fluctuations thereof whereby the mean pressure sought to be measured, may be readily ascertained, substantially as described.

11. In a manometer the combination with the pressure chamber and a measuring tube connected therewith, of a measuring fluid contained therein, means for permitting the flow of air into and out of the measuring tube above the measuring fluid while dampening fluctuation of the measuring fluid by retarding such flow of air out of the tube, such means also preventing the escape of measuring fluid therethrough, and a trap in the pressure chamber above the measuring fluid comprising a solid plug of such porosity as to permit free flow of air to the pressure chamber and to prevent the escape of the measuring fluid therethrough.

Signed at New York, N. Y., October 6th, 1920.

WILLIAM A. BAUM.